: US 10,754,345 B2
(45) Date of Patent: Aug. 25, 2020

(54) METHOD FOR OPERATING A SELF-DRIVING MOTOR VEHICLE AND SELF-DRIVING MOTOR VEHICLE

(71) Applicant: Dr. Ing. h.c. F. Porsche Aktiengesellschaft, Stuttgart (DE)

(72) Inventor: Martin Roth, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 105 days.

(21) Appl. No.: 16/161,431

(22) Filed: Oct. 16, 2018

(65) Prior Publication Data

US 2019/0121363 A1 Apr. 25, 2019

(30) Foreign Application Priority Data

Oct. 25, 2017 (DE) .......................... 10 2017 124 951

(51) Int. Cl.
*G01C 22/00* (2006.01)
*G05D 1/00* (2006.01)
*G05D 1/02* (2020.01)
*B60W 30/14* (2006.01)
*B60W 40/105* (2012.01)
*G01C 21/34* (2006.01)

(52) U.S. Cl.
CPC ......... *G05D 1/0223* (2013.01); *B60W 30/143* (2013.01); *B60W 40/105* (2013.01); *G01C 21/3492* (2013.01); *G05D 1/0276* (2013.01); *B60W 2520/10* (2013.01); *G05D 2201/0213* (2013.01)

(58) Field of Classification Search
CPC .. G05D 1/0223; G05D 1/0276; G05D 1/0274; G05D 2201/0213; B60W 30/143; B60W 40/105; B60W 2520/10; G01C 21/3492
USPC .......................................................... 701/23
See application file for complete search history.

(56) References Cited

U.S. PATENT DOCUMENTS

| 9,540,005 B1 * | 1/2017 | Howe-Veenstra ..... G01C 21/34 |
| 2005/0021225 A1 * | 1/2005 | Kantarjiev ........... G08G 1/0112 701/527 |
| 2017/0219365 A1 * | 8/2017 | Zhou .................. G01C 21/3469 |
| 2017/0308094 A1 * | 10/2017 | Abe .................... G01C 21/3415 |
| 2019/0107839 A1 * | 4/2019 | Parashar ............... B60W 30/00 |
| 2019/0121362 A1 * | 4/2019 | Russell ................. B60W 30/16 |

* cited by examiner

*Primary Examiner* — Mahmoud S Ismail
(74) *Attorney, Agent, or Firm* — RatnerPrestia

(57) ABSTRACT

A method for operating a self-driving motor vehicle. A prescribed starting location and a prescribed destination are used to ascertain a driving route. A speed trajectory is determined for the ascertained driving route and the motor vehicle drives along the driving route independently on the basis of the determined speed trajectory. The determination of the speed trajectory includes the following method steps: (i) ascertainment of multiple candidate speed trajectories for the ascertained driving route, (ii) computation of an unpunctuality characteristic value for each of the ascertained candidate speed trajectories, wherein the unpunctuality characteristic value is a measure of a divergence from a prescribed desired time of arrival at the destination, and (iii) selection of that candidate speed trajectory having the unpunctuality characteristic value with the smallest magnitude.

11 Claims, 6 Drawing Sheets

METHOD FOR OPERATING A SELF-DRIVING MOTOR VEHICLE AND SELF-DRIVING MOTOR VEHICLE

CROSS-REFERENCE TO RELATED APPLICATION

This application claims priority to German Patent Application No. DE 10 2017 124 951.6, filed Oct. 25, 2017, which is incorporated by reference herein in its entirety.

FIELD OF THE INVENTION

The present invention relates to a method for operating a self-driving motor vehicle. Further, the invention relates to a self-driving motor vehicle.

BACKGROUND OF THE INVENTION

Self-driving or autonomous motor vehicles are understood to mean such automobiles or other motor vehicles as can participate in road traffic without the influence of a human driver, i.e. can drive, control and park without human intervention.

Self-driving vehicles of this kind are expected to depart from a starting location at a prescribed starting time and to reach a prescribed destination after a prescribed driving time. This means that the destination is intended to be reached not as quickly as possible but rather as punctually as possible.

The most punctual possible arrival at a prescribed destination is not achievable with the driving strategies of known driver assistance systems, such as adaptive cruise control (ACC), for example.

Against this background, described herein is a method for operating a self-driving motor vehicle that allows the most punctual possible arrival at a prescribed destination.

SUMMARY OF THE INVENTION

A method for operating a self-driving motor vehicle, wherein a prescribed starting location and a prescribed destination are used to ascertain a driving route, wherein a speed trajectory is determined for the ascertained driving route and the motor vehicle drives along the driving route independently on the basis of the determined speed trajectory, wherein the determination of the speed trajectory comprises the following method steps:
  ascertainment of multiple candidate speed trajectories for the ascertained driving route,
  computation of an unpunctuality characteristic value for each of the ascertained candidate speed trajectories, wherein the unpunctuality characteristic value is a measure of a divergence from a prescribed desired time of arrival at the destination, and
  selection of that candidate speed trajectory having the unpunctuality characteristic value with the smallest magnitude.

The method according to aspects of the invention involves a prescribed starting location and a prescribed destination first of all being used to ascertain a driving route. The driving route can be ascertained by means of a navigation system of the vehicle or by means of a vehicle-external navigation system, for example. For this ascertained driving route, scheduling is then performed, in which a speed trajectory for the ascertained driving route is determined, i.e. a preset speed for speed control of the self-driving motor vehicle. To determine the speed trajectory, multiple candidate speed trajectories for the ascertained driving route are ascertained. The candidate speed trajectories are alternative speed trajectories for the same journey. For the ascertained candidate speed trajectories, a respective unpunctuality characteristic value is then ascertained. This is a measure of a divergence from a prescribed desired time of arrival at the destination. That candidate speed trajectory that has the unpunctuality characteristic value with the smallest magnitude is then selected. On the basis of this speed trajectory, the motor vehicle drives along the driving route independently. It is thus possible for the motor vehicle to arrive at the destination as close to the desired time of arrival as possible, i.e. to be as punctual as possible.

Advantageous configurations and developments of the invention are evident from the subclaims and from the description with reference to the drawings.

According to an advantageous configuration, the unpunctuality characteristic value of a speed trajectory is computed by virtue of respective partial unpunctuality characteristic values of multiple partial speed trajectories of the speed trajectory being ascertained and a sum of multiple partial unpunctuality characteristic values being formed. The partial speed trajectories each describe a section of the whole speed trajectory, preferably from a first waypoint on the driving route to a second waypoint on the driving route.

It is preferred if a partial unpunctuality characteristic value is computed on the basis of an average speed of part of the ascertained driving route, a setpoint average speed and a length proportion of the part of the ascertained driving route over the whole driving route. As a particular preference, the partial unpunctuality characteristic value is ascertained according to $$K = (v_{ms \to s+1} - v_{m-setpoint}) \frac{(x_{s+1} - x_s)}{s},$$

where K is the partial unpunctuality characteristic value, $v_{ms \to s+1}$ is the average speed of part of the ascertained driving route, $v_{m-setpoint}$ is the setpoint average speed, $x_{s+1} - x_s$ is the length of the part of the ascertained driving route and s is the length of the whole driving route.

According to an advantageous configuration, a maximum speed profile and a minimum speed profile over the ascertained driving route are ascertained on the basis of journey data, wherein only such candidate speed trajectories as trend completely within a speed band between the maximum speed profile and the minimum speed profile are taken into consideration for the selection of the speed trajectory. In this case, the journey data used can in particular be maximum and minimum values of the permitted speed, acceleration and deceleration. For the maximum speed profile, it is alternatively or additionally possible to use upper limits for a transverse acceleration in curves in conjunction with curve radii, upward slopes, downward slopes, inclinations, comfort criteria and/or driving style criteria.

According to an advantageous configuration, the selection of the speed trajectory takes into consideration only such candidate speed trajectories as satisfy a prescribed comfort and/or driving style criterion. The comfort and/or driving style criterion may be a maximum acceleration, so that only such candidate speed trajectories as result in an acceleration below the prescribed maximum acceleration are taken into consideration. In this manner, it is possible for the computation time and the required memory space to be reduced.

It is advantageous if a waypoint speed grid consisting of multiple grid nodes is produced, wherein the waypoint speed grid has, for each waypoint on the driving route, multiple grid nodes that are consistent with different speeds at the waypoint. On the basis of the waypoint speed grid, the candidate speed trajectories can be ascertained and that candidate speed trajectory having the unpunctuality characteristic value with the smallest magnitude can be selected.

According to an advantageous configuration, a computation step involves ascertaining for multiple grid nodes of a waypoint in each case multiple candidate partial speed trajectories to multiple grid nodes of a subsequent waypoint on the driving route, wherein a partial unpunctuality characteristic value is ascertained for each candidate partial speed trajectory. In this respect, all of the candidate partial speed trajectories that can trend to a subsequent waypoint are ascertained and rated for the waypoint.

It is preferred if the computation step is performed for all waypoints on the driving route, so that applicable partial unpunctuality characteristic values are ascertained for all candidate partial speed trajectories between the grid nodes of the waypoints on the ascertained driving route.

According to an advantageous configuration, an intermediate unpunctuality characteristic value is computed for all candidate partial speed trajectories entering the grid nodes of a waypoint. This intermediate unpunctuality characteristic value can be ascertained as the sum of the partial unpunctuality characteristic values accumulated from the starting point on the driving route and forms a measure of the unpunctuality accumulated from the starting point on the driving route to the current (intermediate) waypoint. As a preference, the intermediate unpunctuality characteristic value is ascertained from the starting point on the driving route to the destination on the driving route, the intermediate unpunctuality characteristic values at a first waypoint being computed using the computations of the intermediate unpunctuality characteristic values at the respective preceding waypoint.

In this connection, it is advantageous if the partial unpunctuality characteristic value is ascertained by virtue of the setpoint average speed being derived from an average speed profile produced by a shift in the maximum speed profile. In this case, the setpoint average speed $v_{m\text{-}setpoint}$ used can be the value of the average speed profile defined at the current waypoint. This affords the advantage that from the outset a trajectory arises analogously to the average speed profile and hence better matches the real requirements in the traffic. This average speed profile can diverge, however, in order to avoid inadmissible operating states (e.g. hard comfort or driving style criteria) or in particular after the beginning of a journey, if divergences are already present.

According to an advantageous configuration of the invention, the speed trajectory is determined by means of a planning device arranged in or on the self-driving motor vehicle. According to an alternative, advantageous configuration, the speed trajectory is determined by means of a planning device arranged remotely from the self-driving motor vehicle and the speed trajectory is transmitted to the motor vehicle.

According to an advantageous configuration of the invention, a check is performed to determine whether a change of driving route and/or of speed trajectory is required, and the driving route and/or speed trajectory is updated while the motor vehicle drives along the driving route. To check whether a change in the driving route and/or in the speed trajectory is necessary, it is possible to monitor whether data pertaining to the volume of traffic and/or to the weather conditions and/or to obstacles on the journey have altered.

A further subject of the invention is a self-driving motor vehicle having a navigation device for ascertaining a driving route on the basis of a prescribed starting location and a prescribed destination, having a planning device for determining a speed trajectory for the ascertained driving route and an actuating device for actuating elements of the motor vehicle, so that the motor vehicle can drive along the driving route independently on the basis of the determined speed trajectory, wherein the planning device is set up to perform the following method steps:
  ascertainment of multiple candidate speed trajectories for the ascertained driving route,
  computation of an unpunctuality characteristic value for each of the ascertained candidate speed trajectories, wherein the unpunctuality characteristic value is a measure of a divergence from a prescribed desired time of arrival at the destination, and
  selection of that candidate speed trajectory having the unpunctuality characteristic value with the smallest magnitude.

The same advantages can be achieved for the self-driving motor vehicle as have already been described in connection with the method according to aspects of the invention. Further, it is also possible for the advantageous features and configurations described above for the method to be applied on their own or in combination to the self-driving motor vehicle.

BRIEF DESCRIPTION OF THE DRAWINGS

Further details, features and advantages of the invention emerge from the drawings and from the description of preferred embodiments below with reference to the drawings. In this case, the drawings merely illustrate exemplary embodiments of the invention that do not limit the inventive concept.

DETAILED DESCRIPTION OF THE INVENTION

Figure 1:
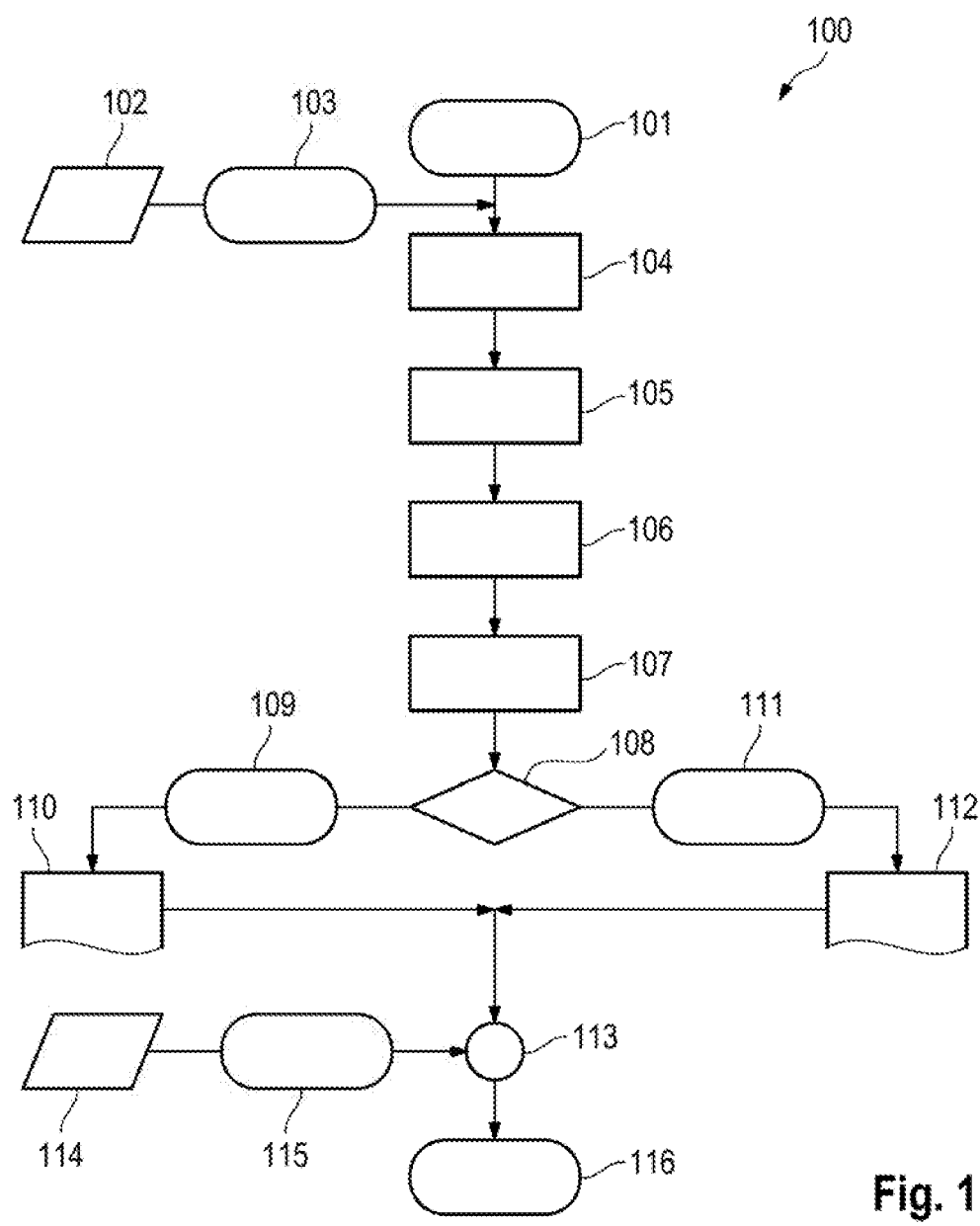
FIG. 1 shows a flowchart for an exemplary embodiment of the method according to aspects of the invention for operating a self-driving motor vehicle.

FIG. 1 shows a flowchart for an exemplary embodiment of the method 100 according to aspects of the invention for operating a self-driving motor vehicle. In a request step 102, a user, for example using a mobile communication device, prescribes a destination and a desired time of arrival. As a preference, the request step 102 is performed on the mobile communication device as part of an app. In a transmission step 103, the prescribed destination and the desired time of arrival are transmitted to a planning device of the self-driving motor vehicle or of a computer center provided separately from the motor vehicle. In the planning device, a driving route is first of all ascertained from a starting state 101 in a navigation step 104 on the basis of a prescribed starting location and the prescribed destination. The navigation data of the driving route are buffer-stored. The navigation step 104 is performed in a navigation device of the planning device. In a subsequent storage step 105, journey data and/or data pertaining to the volume of traffic and/or pertaining to the weather conditions and/or pertaining to obstacles on the journey are buffer-stored.

In an initialization step 106, a partial unpunctuality characteristic value is defined as a measure of a divergence from a prescribed desired time of arrival at the destination. As a preference, the partial unpunctuality characteristic value K used for a prescribed part of the ascertained driving route is the divergence from the setpoint average speed $v_{msetpoint}$ that would be required on average multiplied by the length proportion $(x_{s+1}-x_s)/s$ of the part of the ascertained driving route over the whole driving route. In this respect, the partial unpunctuality characteristic value can be computed as $$K = (v_{ms \to s+1} - v_{m-setpoint})\frac{(x_{s+1} - x_s)}{s}$$

where K is the partial unpunctuality characteristic value, $v_{ms \to s+1}$ is the average speed of part of the ascertained driving route, $v_{m-setpoint}$ is the setpoint average speed, $x_{s+1}-x_s$ is the length of the part of the ascertained driving route and s is the length of the whole driving route.

In a scheduling step 107, which is performed in a scheduling device, a speed trajectory for the driving route ascertained in the navigation step 104 is then determined. The scheduling device is set up to perform the method steps below, which will be discussed in detail:

ascertainment of multiple candidate speed trajectories for the ascertained driving route, computation of an unpunctuality characteristic value for each of the ascertained candidate speed trajectories, wherein the unpunctuality characteristic value is a measure of a divergence from a prescribed desired time of arrival at the destination, and selection of that candidate speed trajectory having the unpunctuality characteristic value with the smallest magnitude.

On the basis of the selected candidate speed trajectory, a checking step 108 is used to check whether the desired time of arrival is achievable. If this is the case, then the planning device sends confirmation to the user, in particular to the mobile communication device, in a sending step 111, so that the confirmation can be displayed in step 112, possibly together with further information, such as the driving route and the ascertained speed trajectory, for example. If the desired time of arrival is unachievable, the planning device sends a message to the user, in particular to the mobile communication device, in a sending step 109. An achievable alternative time of arrival that is after the desired time of arrival can be displayed in the mobile communication device, possibly together with further information, such as the driving route and the ascertained speed trajectory, for example, cf. display step 110.

If the method 100 is performed by means of a planning device in an external computer center, then the data 114 required for driving, i.e. the ascertained speed trajectory and possibly the driving route, are transmitted from the external computer center to the self-driving motor vehicle, cf. transmission step 115.

In the ready state 113, the self-driving motor vehicle is ready to depart. Both data pertaining to the ascertained driving route and a speed trajectory are available, so that the motor vehicle can drive along the driving route in the driving step 116 independently on the basis of the determined speed trajectory.

Figure 2:
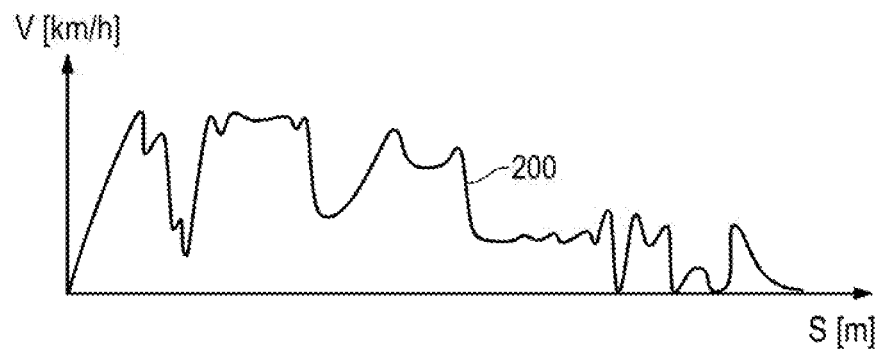
FIG. 2 shows a speed trajectory.

FIG. 2 shows an exemplary ascertained speed trajectory 200 describing the planned profile of the speed V in the direction of travel of the self-driving motor vehicle over the whole driving route.

The sequences during the scheduling step 107, which aims to ascertain a speed trajectory 200 for the selected driving route, will be discussed in detail below.

Figure 3:
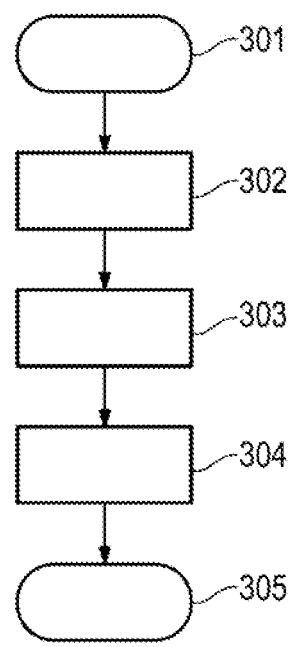
FIG. 3 shows a flowchart for an exemplary method sequence for producing a waypoint speed grid.

To ascertain the speed trajectory, a waypoint speed grid 404 consisting of multiple grid nodes 405 is first of all produced, wherein the waypoint speed grid 404 has, for each waypoint on the driving route, multiple grid nodes 405 that are consistent with different speeds at the waypoint. The depiction in FIG. 3 shows an exemplary method sequence for producing such a waypoint speed grid 404. Beginning from a starting state 301, the ascertained driving route is broken down in a first discretization step 302 into multiple parts whose start and end are each defined by waypoints on the driving route. The waypoints are preferably at an identical distance. Alternatively, it is possible for the distances between the waypoints to be different. In a second discretization step 303, the range of possible speeds of the motor vehicle is likewise broken down into parts and speed points are produced that preferably have an identical speed difference.

Figure 4:
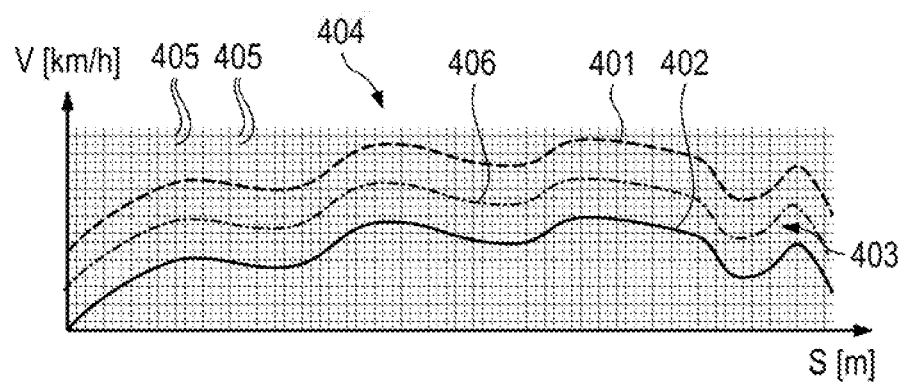
FIG. 4 shows a waypoint speed grid.

Finally, in a band production step 304, a maximum speed profile 401 and a minimum speed profile 402 over the ascertained driving route are ascertained on the basis of journey data, cf. the depiction in FIG. 4. As a preference, the maximum speed profile 401 is ascertained by using maximum values of the permitted speed (legal speed limits), upper limits for accelerations and decelerations, upper limits for transverse accelerations in curves in conjunction with the journey data, curve radii, upward slope, downward slope, inclination, etc.), comfort criteria, driving style criteria. The minimum speed profile 402 is ascertained by preferably using lower limits for accelerations, decelerations, constant speeds. The speed band 403 between the maximum speed profile 401 and the minimum speed profile 402 forms the basis for the selection of a speed trajectory. Only such possible speed trajectories, what are known as candidate speed trajectories, as trend completely within the speed band 403 between the maximum speed profile 401 and the minimum speed profile 402 are considered below. Optionally, the setpoint average speed $v_{m-setpoint}$ for ascertaining the partial unpunctuality characteristic value can be derived from an average speed profile 406, which is produced by shifting the maximum speed profile 401.

Figure 5:
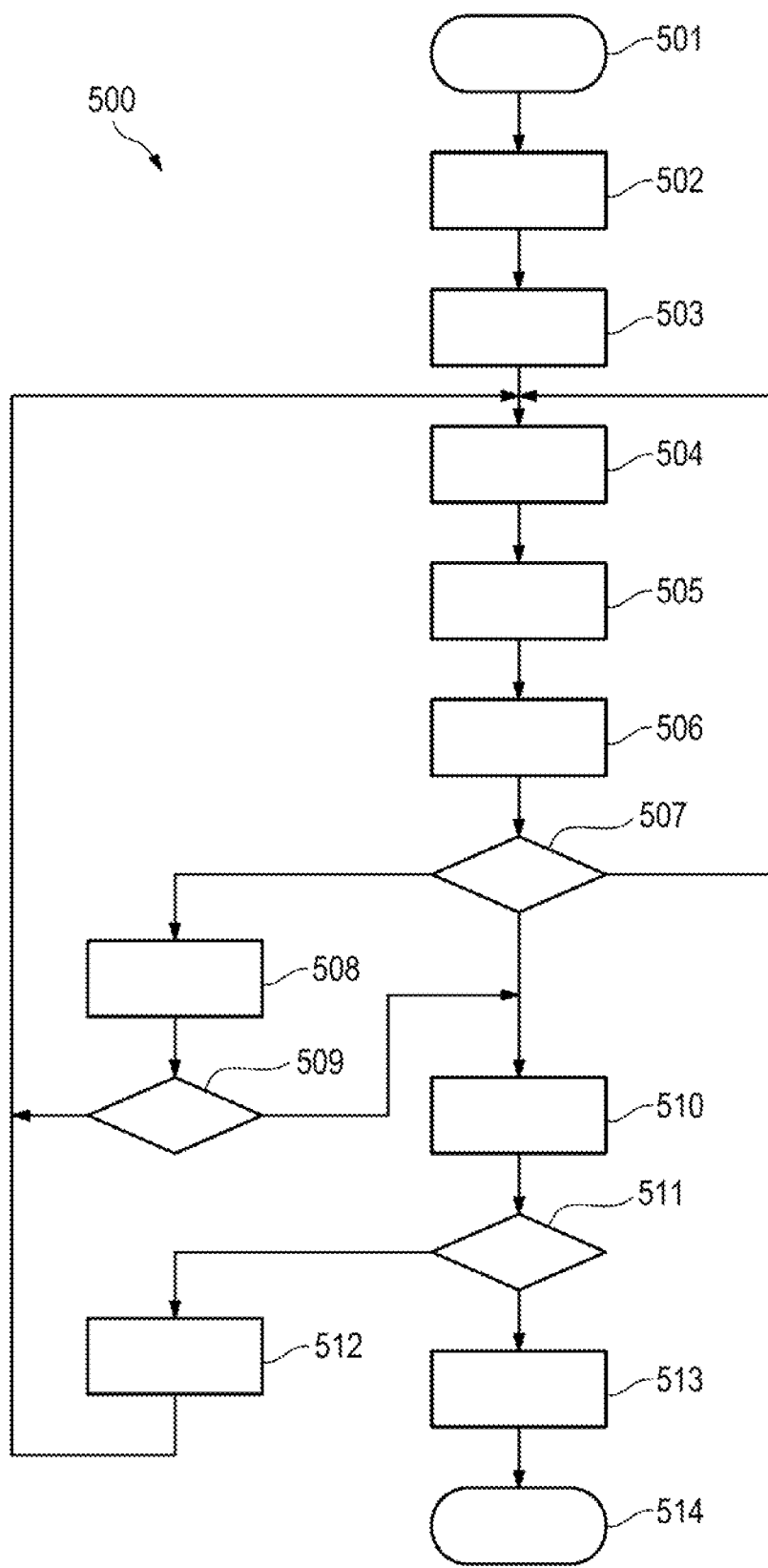
FIG. 5 shows a flowchart for an exemplary method sequence for determining a speed trajectory.

FIG. 5 depicts the whole sequence 500 of the scheduling. Beginning from a starting state 501, the waypoint speed grid and the speed band 403 are produced. These processes are combined in the step 502 in the depiction in FIG. 5. In the subsequent initialization step 503, a starting grid node for the starting location (generally $x_s$) and a grid node for a subsequent waypoint (generally $x_{s+1}$ are defined. At the starting grid node, the speed is zero.

In a subsequent loop with steps 504, 505, 506 and 507, all candidate partial speed trajectories from the grid node at $x_s$ to all grid nodes at $x_{s+1}$ are formed that are within the speed band 403. This loop comprises a simulation step 504 in which a movement by the motor vehicle from the waypoint $x_s$ to the waypoint $x_{s+1}$ that is consistent with the respective candidate partial speed trajectory is simulated. In a computation step 505, a partial unpunctuality characteristic value is ascertained for the applicable candidate partial speed trajectory. In order to form an intermediate unpunctuality characteristic value, the partial unpunctuality characteristic value is added to the previously accumulated partial unpunctuality characteristic values of the respective candidate speed trajectory.

Figure 6:
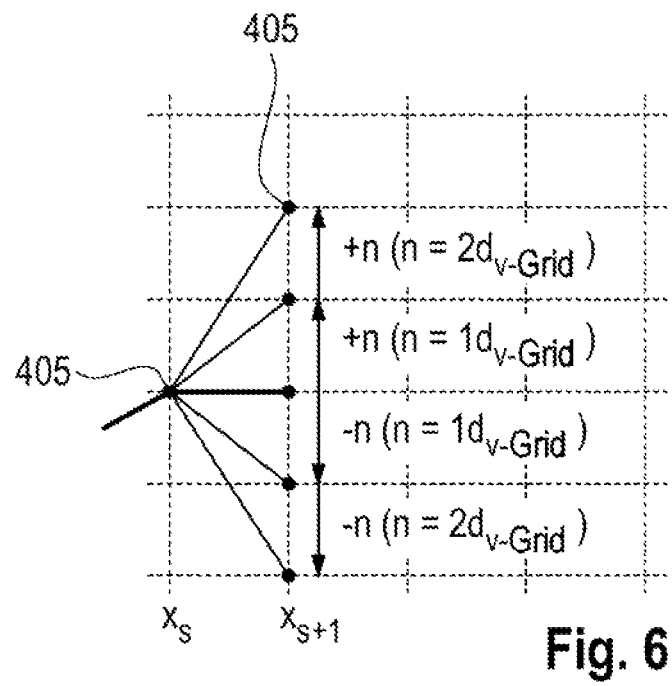
FIGS. 6 and 7 show a detail from a waypoint speed grid to illustrate the sequences in the production of partial speed trajectories.

FIG. 6 shows multiple candidate partial speed trajectories from the grid node 405 at $x_s$ to the grid nodes 405 at $x_{s+1}$. According to an exemplary sequence, the variable n starts at n=0. It stores to where the speed trajectory needs to be extended, in particular by how many speed units a grid node 405 at $x_{s+1}$ is headed for above the initial speed at $x_s$. This is repeated for the grid node 405 at $x_s$, and n is then increased by $d_{vgrid}$ (step 506), often enough for all options for extending the speed trajectory at higher speed and remaining in the speed band 403 to be exhausted. Before the extension, a check is performed to determine whether this is possible, that is to say in particular minimum comfort requirements are met. If this is not the case, the possible extension is not used and not stored. At the same time, the possible candidate partial speed trajectories for grid nodes 405 with lowered speed values are ascertained in the loop with steps 504, 505, 506 and 507. This is effected analogously to the above-described extension of the speed trajectories to higher speed values. When the minimum speed profile 402 is reached, the process is stopped. As shown in FIG. 6, a multiplicity of candidate partial speed trajectories at $x_{s+1}$ with all the possible final speeds are therefore produced beginning from a grid node 405 at $x_s$. The checking step 507 is used to check whether all possible candidate partial speed trajectories in the speed band 403 starting from the grid node 405 at $x_s$ are ascertained and the applicable partial unpunctuality characteristic values are computed.

Figure 7:
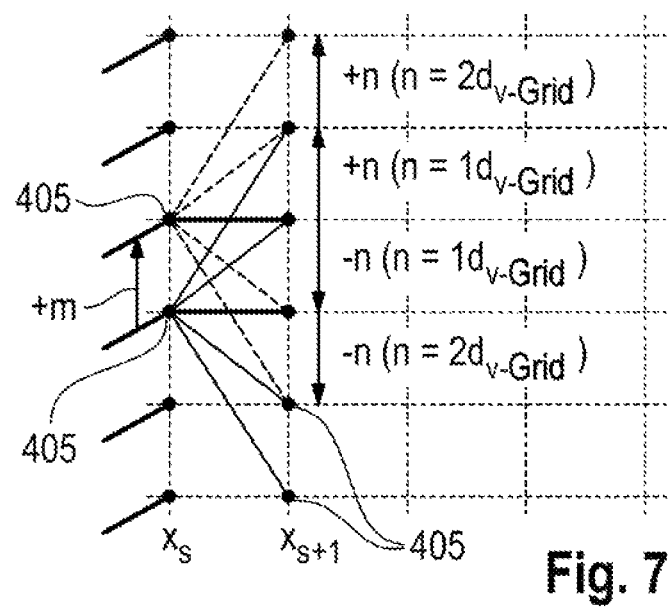

A second loop 508, 509, depicted in FIG. 5, with the variable m ensures that additionally speed trajectories ending at other grid nodes 405 of the waypoint $x_s$ are also extended by applicable candidate partial speed trajectories. In a step 508, the variable m is raised and/or lowered by $d_{vgrid}$, so that the computation in steps 504, 505, 506 can also take place for these further candidate partial speed trajectories. The additional candidate partial speed trajectories of a further grid node at $x_s$ are depicted in FIG. 7.

Figure 8:
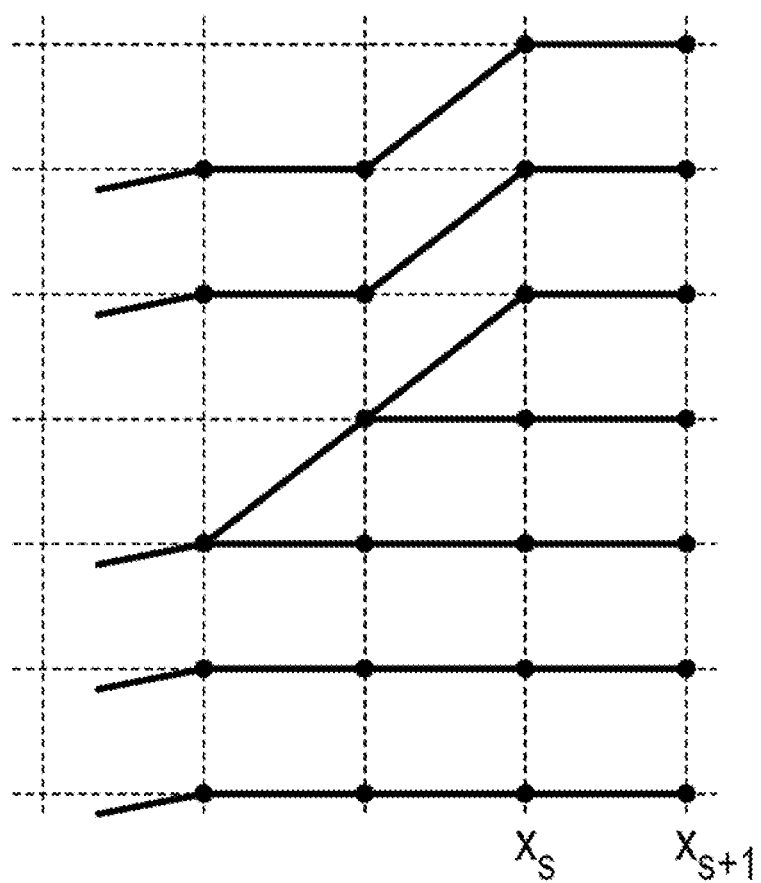
FIG. 8 shows a detail from a waypoint speed grid for illustration with multiple candidate speed trajectories.

The checking step 509 is used to check whether all possible candidate partial speed trajectories in the speed band 403 have been produced. Thus, the previous intermediate speed trajectories ending at a grid node at $x_s$ are no longer required and can be erased, cf. erasure step 510. A grid node at $x_{s+1}$ can then have no speed trajectories or one or more speed trajectories ending at it. If multiple speed trajectories end at a grid node at $x_{s+1}$, only that speed trajectory that has the lowest unpunctuality characteristic value is continued. All other speed trajectories of this grid node are erased. This state is depicted by way of example in FIG. 8.

The checking step 511 is used to check whether the end of the prescribed driving route has been reached. If this is not the case, the sequence described above is performed for a next pair of waypoints on the driving route. The variable s is increased by 1, cf. step 512.

These three nested loops continue to work until the destination on the driving route has been reached. In the selection step 513, that candidate speed trajectory having the lowest unpunctuality characteristic value among the candidate speed trajectories arriving at the destination is then selected as the ascertained speed trajectory 200. On the basis of this speed trajectory 200, the independent driving of the motor vehicle then takes place.

Figure 9:
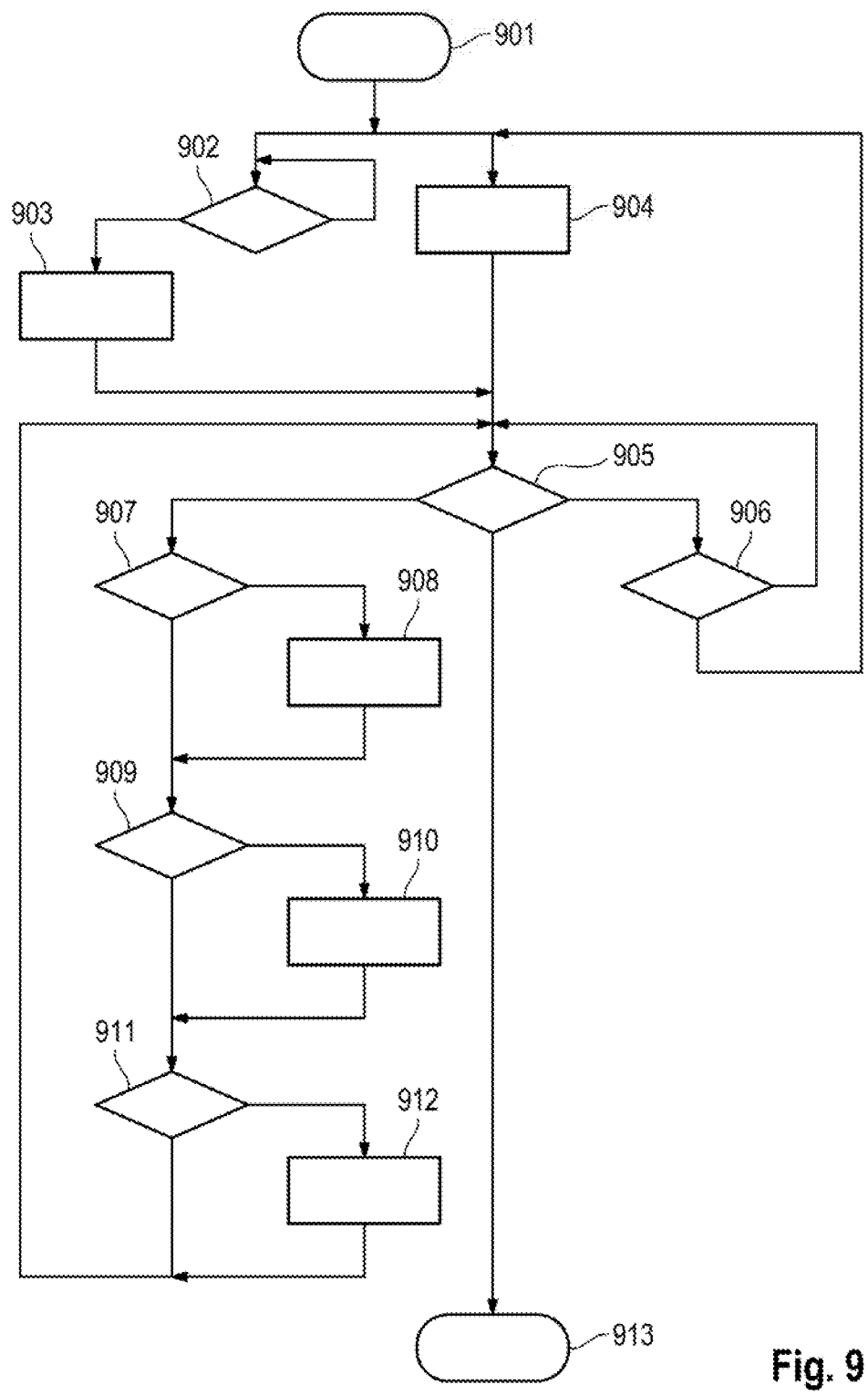
FIG. 9 shows a flowchart for an exemplary method sequence for the motor vehicle to independently drive along the driving route.

FIG. 9 shows a flowchart for an exemplary method sequence for the motor vehicle independently driving along the driving route. The depicted driving control relates exclusively to longitudinal control, i.e. the adjustment of a speed of travel, with the aim of arriving at the destination as punctually as possible. The steering is not considered in this case.

During driving, multiple processes are executed in parallel. Beginning from a starting state 901, the actuating elements of the motor vehicle are actuated in an actuation step 904 depending on journey points in real time on the basis of the ascertained speed trajectory 200. For each discrete waypoint on the driving route the applicable data record contains a specific setpoint speed. The actual speed of the motor vehicle is regulated to the setpoint speed. A checking step 905 is used to check whether the destination has been reached. When the destination is reached, the process ends in an end state 913. Otherwise, checking step 906 is used to check whether the actuation of the actuating elements needs to be changed and the actuation step 904 is continued.

In parallel therewith, a checking step 902 is used to continuously check whether an emergency situation has arisen. If such an emergency situation has arisen, for example if an obstacle is suddenly detected and emergency braking is required, the actuating elements are actuated according to an emergency algorithm, cf. emergency step 903.

Also, in parallel therewith, checking step 907 is used to check whether an update for the data pertaining to the journey, pertaining to the environment, pertaining to the weather conditions and/or pertaining to the traffic conditions is required. If this is the case, an update takes place in an update step 908. Further, a checking step 909 is used to check whether recalculation of the driving route is required. If this is the case, an update for the driving route takes place in update step 910. A further checking step 911 is used to check whether an update for the selected speed trajectory is required, for example because data pertaining to the journey have changed or an update for the driving route has taken place. If this is the case, an update step is used to perform fresh ascertainment of the speed trajectory, in this regard see FIG. 5.

According to a modification of the method described above, a time reserve is taken into consideration when the desired time of arrival is prescribed. By way of example, when the speed trajectory is ascertained, a modified desired time of arrival can be prescribed that is obtained from the actual desired time of arrival minus the time reserve. The time reserve may be 10 minutes, for example, or 5% of the driving time or 10% of the driving time. As a particular preference, the speed trajectory is updated during the journey by virtue of the time reserve considered over the driving route being reduced in steps or continuously.

What is claimed is:
1. A method for operating a self-driving motor vehicle, said method comprising:
　using a starting location and a prescribed destination to ascertain a driving route,
　determining a speed trajectory for the ascertained driving route; and autonomously driving the self-driving motor vehicle along the driving route on the basis of the determined speed trajectory, wherein the determining step comprises the following sub-steps:

(i) ascertaining multiple candidate speed trajectories for the ascertained driving route, (ii) computing an unpunctuality characteristic value for each of the ascertained candidate speed trajectories, wherein the unpunctuality characteristic value is a measure of a divergence from a prescribed desired time of arrival at the prescribed destination, and (iii) selecting the candidate speed trajectory having the unpunctuality characteristic value with a smallest magnitude.

2. The method as claimed in claim 1, further comprising computing the unpunctuality characteristic value of a speed trajectory by virtue of respective partial unpunctuality characteristic values of multiple partial speed trajectories of the speed trajectory being ascertained and a sum of multiple partial unpunctuality characteristic values being formed.

3. The method as claimed in claim 1, further comprising computing a partial unpunctuality characteristic value on the basis of an average speed of part of the ascertained driving route, a setpoint average speed and a length proportion of the part of the ascertained driving route over an entirety of the driving route.

4. The method as claimed in claim 1, further comprising ascertaining a maximum speed profile and a minimum speed profile over the ascertained driving route on the basis of journey data including maximum and minimum values of a permitted speed, acceleration and deceleration, wherein only such candidate speed trajectories that trend completely within a speed band between the maximum speed profile and the minimum speed profile are taken into consideration for the selection of the speed trajectory.

5. The method as claimed in claim 1 further comprising producing a waypoint speed grid comprising multiple grid nodes, wherein the waypoint speed grid has, for each waypoint on the driving route, multiple grid nodes that are consistent with different speeds at the waypoint.

6. The method as claimed in claim 5, further comprising a computation step including ascertaining for multiple grid nodes of a waypoint, in each case, multiple candidate partial speed trajectories to multiple grid nodes of a subsequent waypoint on the driving route, wherein a partial unpunctuality characteristic value is ascertained for each candidate partial speed trajectory.

7. The method as claimed in claim 6, further comprising performing the computation step for all waypoints on the driving route.

8. The method as claimed in claim 6, further comprising computing an intermediate unpunctuality characteristic value for all candidate partial speed trajectories entering the grid nodes of a waypoint.

9. The method as claimed in claim 1, further comprising determining the speed trajectory by either (i) a planning device arranged either in or on the self-driving motor vehicle, or (ii) a planning device arranged remotely from the self-driving motor vehicle and, whereby the speed trajectory is transmitted to the self-driving motor vehicle.

10. The method as claimed in claim 1, further comprising performing a check to determine whether a change of driving route, speed trajectory, or both the driving route and the speed trajectory, is/are required, and then updating the driving route, speed trajectory, or both the driving route and the speed trajectory while the self-driving motor vehicle drives along the driving route.

11. A self-driving motor vehicle comprising:

a navigation device for ascertaining a driving route on a basis of a prescribed starting location and a prescribed destination, a planning device for determining a speed trajectory for the ascertained driving route;

an actuating device for actuating elements of the self-driving motor vehicle so that the self-driving motor vehicle can drive independently along the ascertained driving route on the basis of the determined speed trajectory, wherein the planning device is configured to (i) ascertain multiple candidate speed trajectories for the ascertained driving route, (ii) compute an unpunctuality characteristic value for each of the ascertained candidate speed trajectories, wherein the unpunctuality characteristic value is a measure of a divergence from a prescribed desired time of arrival at the prescribed destination, and (iii) select the candidate speed trajectory having the unpunctuality characteristic value with a smallest magnitude.

* * * * *